Nov. 17, 1970 J. J. DRAGE 3,541,316

CALCULATOR WITH DECIMAL POINT POSITIONING

Filed April 20, 1967 2 Sheets-Sheet 1

James J. Drage

By Laurence R. Brown

Attorney

CALCULATOR WITH DECIMAL POINT POSITIONING

James J. Drage

By Laurence R. Brown

Attorney

United States Patent Office 3,541,316
Patented Nov. 17, 1970

3,541,316

CALCULATOR WITH DECIMAL POINT POSITIONING

James John Drage, Uxbridge, England, assignor to Bell Punch Company Limited, Uxbridge, England, a British company Filed Apr. 20, 1967, Ser. No. 632,234
Claims priority, application Great Britain, Apr. 22, 1966, 17,641/66
Int. Cl. G06f *7/46*
U.S. Cl. 235—160 11 Claims

ABSTRACT OF THE DISCLOSURE

An electronic calculating machine is provided with a pair of multiple stage registers, a counter for establishing a decimal point at a single position between two stages of each register and automatic means for positioning the decimal point for various types of calculations either in the registers or in the answer. One of the decimal point counters visually displays the decimal point. The positioning is made responsive to the supplying of pulses into the counters such as by means of electronic gates when appropriate conditions are satisfied during the selected type of calculation.

This invention has reference to calculating machines and has particular reference to calculating machines sometimes referred to as ten key machines which include a single set of ten keys bearing the numbers 0 to 9 as well as a set of instruction or function keys. These instruction keys serve to instruct the machine as to what arithmetic operation is to be carried out. For example, the key may instruct the machine to carry out the arithmetic calculation of addition, subtraction, multiplication or division.

In such machines it is desirable to incorporate a means to indicate the position of a decimal point in the answer to the arithmetic calculation. It is also desirable to include a means whereby in addition and subtraction calculations the same denominations are added or subtracted. Thus, for example, in carrying out an addition operation it is essential that the unit digit of the first addendum is added to the unit digit of the second addendum and the tens digit of the first addendum is added to the tens digit of the second addendum, etc.

Similarly, it is essential in carrying out a subtraction sum to have the unit and other respective digits of the minuend and subtrahend entering into the registers in aligned manner.

It is an object of the present invention to provide an improved calculating machine embodying a means for automatically indicating the position of a decimal point in an arithmetic sum.

It is another object of the present invention to provide a calculating machine which embodies means for aligning the respective digits of the numbers of the calculation to be effected.

According to the present invention a calculating machine includes a pair of registers each having a plurality of stages and each register having a decimal point register counter with a plurality of positions; each position representing the position of a decimal point betwen two adjacent stages of the register and only one decimal point position of which is operative at any one time; means for effecting an arithmetic calculation; means for sensing the position of the decimal point in the demical point counter; and means for calculating the position of the decimal point in the decimal point counter corresponding to the answer to the calculation in accordance with the position of the decimal point in the registers and in accordance with the kind of calculation effected.

Figure 1:
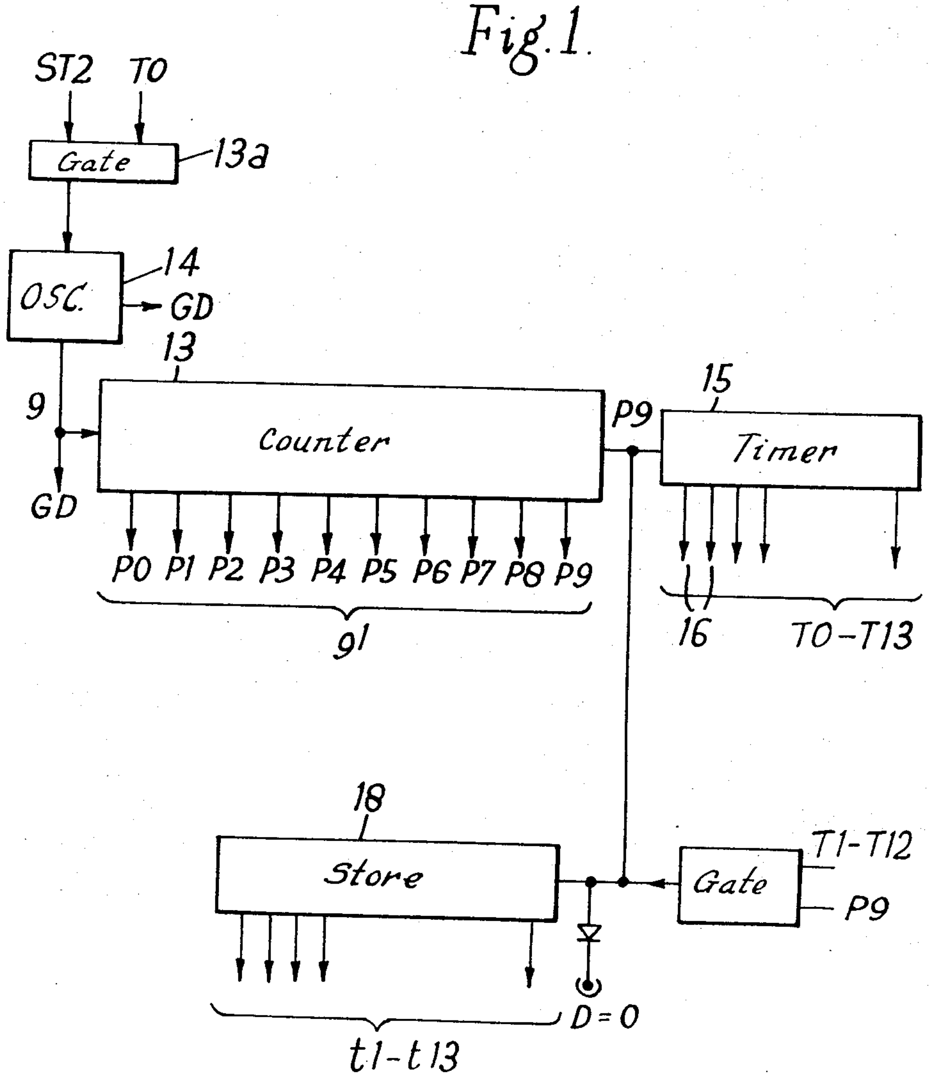
Figure 2:
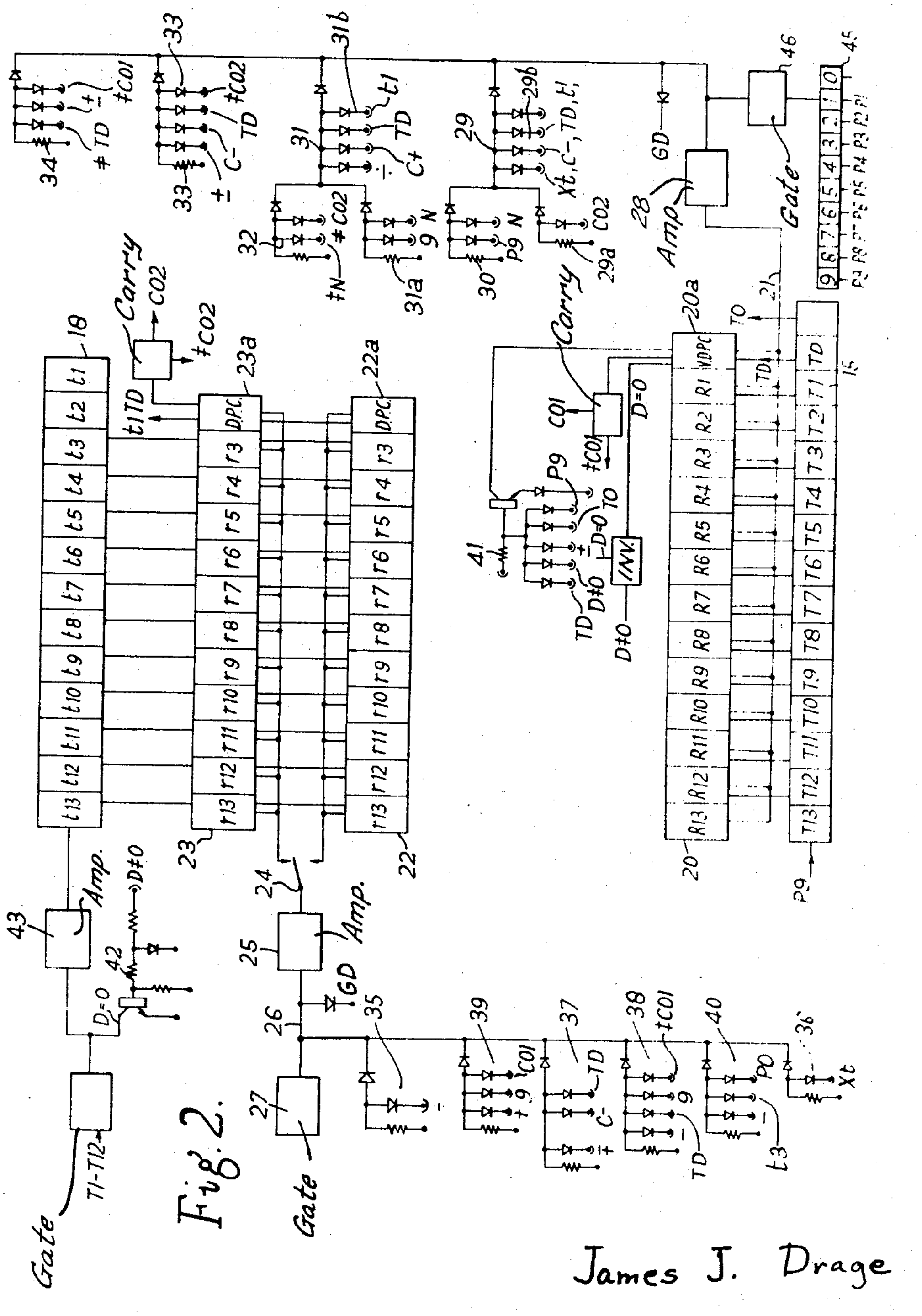

A calculating machine in accordance with the present invention will now be described by way of example with reference to the accompanying drawings, wherein:

FIGS. 1 and 2 are each circuit diagrams of part of the machine.

The calculating machine of FIG. 2 includes a keyboard 45 having ten keys representing the number 0 to 9. Each key is associated with a respective switch and each switch has a facility for connecting respective pulses P1–P9 supplied to the keyboard to the keyboard output line. The contact of the key representative of the number nine is supplied with a pulse P9 while the key representative of the number eight has a pulse P8 applied to it. The other keys have corresponding pulses applied to them with the key representing the number one having a contact to which a pulse P1 is applied. The keyboard is arranged so that on operation of a selected one of the keys the pulse corresponding to that key is passed to the highway line 21 together with the preceding pulses of the particular group of pulses. Thus, if the key No. 4 is depressed, pulse P4 as well as pulses P1, P2, P3 are passed to the highway. The keyboard 45 is connected through a gate circuit 46 to a highway line 21 to be hereinafter described.

Pulses P1 to P9 applied to the respective key contacts of the keyboard 45 are obtained from a decade counter circuit 13 (FIG. 1). An oscillator 14 applies a continuous train of pulses GD to the decade counter circuit 13 which includes an anode and ten cathodes and the circuit is so arranged that only one cathode can conduct at any one time. Thus, assuming for example that the first cathode is conducting, this will mean that current flows through the circuit associated with this cathode and a connection is made to this circuit so that in this condition a pulse is generated along the line P0. On the supply of the next pulse to the decade counter circuit, the second cathode is caused to conduct whilst the first cathode ceases to conduct and likewise a pulse is caused to be generated along the line P1 and the pulse to the line P0 is cut off. Thus, on receipt of a further pulse the next succeeding cathode is caused to conduct and a pulse is passed to the line P2. This continues until the last cathode 10 is conducting. A reference pulse P9 is then emitted and it is arranged that on receipt of the next subsequent pulse, the tenth cathode will cease to conduct and the first cathode will start to conduct. By this means pulses P0 to P9 are generated from the decade counter circuit 13 and the pulses P1 to P9 are passed in turn to the keyboard 45. The pulse P9 emitted at the end of each sequence of ten pulses is passed to a register timer circuit 15 and this register timer circuit is a circuit equivalent to the decade counter circuit except that it consists of fourteen stages and generates the pulses T0 to T13 instead of pulses P0 to P9 of the decade counter circuit 13 and receives a pulse P9 for every ten pulses of the pulses applied to the decade counter circuit 13. Thus, only one tenth of the number of pulses are applied to the timer register as to the decade counter circuit 13. It is arranged that the first pulse received by the register timer circuit causes the first stage of the timer circuit to conduct and a pulse to be generated on the line T1 and on receipt of subsequent pulses causes subsequent lines of the circuit to conduct. This will cause the respective pulses T0 to T13 to be generated along the line 16. The pulse P9 is passed to a store timer circuit 18 as well as to the register timer circuit 15. This store timer circuit 18 is similar to the decade counter circuit 13, but has thirteen stages and generates the pulses *t*1 to *t*13. Receipt of pulses respectively causes the next succeeding line to have a pulse generated along it in sequence. The pulse TD is a timing pulse and during the time this pulse is generated the decimal pointing action, to be hereinafter described, is carried out.

The calculating machine includes a visual register 20 (FIG. 2) having stages R1 to R13 into which numbers are entered from the keyboard in sequence along a pulse highway line 21 as more fully described in the Specification of Application for British Pat. No. 42/1966 assigned to the instant assignee, starting from the left hand stage of the register R12 (R13 being used for storing carry digits carried from the registers R12) to the register stage next on the right hand side thereof. These pulses are entered under the control of the timer circuit 15 to which pulses are applied from the register timer circuit 18.

Two store registers 22 and 23 are also included into which the numbers may be transferred from the visual register 20 stage by stage. A set of number tubes are associated with the visual register to indicate the number stored in the stages of the visual register.

The switch 24 determines which of the store registers 22, 23 is to store numbers transferred from the visual register 20. Pulses are supplied to the switch 24 through an amplifying circuit 25 along the pulse highway line 26 from a set of gates illustrated diagrammatically at 27. This is more fully described in the Specification of the aforesaid Application for British Pat. No. 42/1966.

A series of gates (to be hereinafter described) are connected to the highway 26 and likewise a series of gates (also to be hereinafter described) are connected to the highway 21 through the amplifier circuit 28.

Both of the store registers 22, 23 includes a decimal point counter stage **22*a*, 23*a*. Likewise, the visual register 20 also includes a decimal point counter stage 20*a*. The decimal point counter 20*a* is associated with a series of lamps (not shown) which are located on the machine with respective lamps showing between the number tubes connected to the respective stages of the register 20. Only one lamp in a series of lamps is illuminated at any one time and illumination of a specific lamp gives an indication of a decimal point. The decimal point counter stage 22*a*, 23*a*** does not have a lamp to indicate a decimal point at that stage.

A gate 29 connected to the highway 21 serves to determine the position of the decimal point during the multiplication operation. This multiplication decimal point determining circuit includes a common part **29*b* which in conjunction with a first ancillary part 29*a* determines the decimal point position during multiplication and a second part 30 which in conjunction with the common part 29*b* of the circuit provides a right shift decimal point gate (to be hereinafter described). It will be apparent that the sharing of the common part 29*b* by two circuits 29*a* and 30** saves duplication of components and hence means a reduction in costs.

A division decimal point determining circuit gate 31 is also connected to the highway 21 and similarly this circuit 31 is divided into two halves, a first half 32 which with a common part **31*b* is exclusively concerned with divisional decimal point sensing and a second part 31*a* which with the common part 31*b*** is concerned with a left shift operation (also to be hereinafter described).

A further gate circuit 33 is also connected to the highway 21 and this circuit 33, during addition or subtraction operations, serves to cause a series of pulses to be applied to the visual decimal point counter forming part of the visual register 20, which pulses correspond in number to the tens complement of the number position of the decimal point stored in the store register decimal point counter.

A further circuit gate 34 causes a series of pulses, during addition or subtraction operations, to be passed to the highway 21 up to receipt of the carry pulse C01 and causes the visual registers to be moved to zero and arrested.

A gate 35 is connected to the highway 26 to the store registers 22, 23 and serves as a division flood gate circuit to supply desired pulses to the store registers when division is being effected.

A further gate 36 connected to the highway 26 serves to flood the circuit store registers 22, 23 with pulses during the multiplication operation and a further flood gate 37 provides a supply of pulses to the registers **22*a*, 23*a*** during addition or subtraction operations.

A gate 40 also connected to the highway 26 is arranged to supply an additional pulse during subtraction operations to complete the complement.

A gate 39 to the highway 26 serves as a store drive gate when effecting an addition operation whereas the gate 38 serves as a store drive gate when effecting a subtraction operation.

A drive circuit 41 is connected to the visual decimal point counter of the visual register 20 and serves to drive the visual decimal point counter to zero during addition and subtraction operations.

The drive circuit 42 is connected through an amplifier 43 to the timer circuit 18. This circuit 42 serves as an inhibit gate and inhibits operation of the timer circuit 18 until the timer circuits 15, 18 can run together.

In effecting arithmetical operations in this machine, pulses are applied to the respective stages of the register 20 and to the respective stages of the registers 22 or 23 and the resulting number is indicated in the visual register 20 in the case of multiplication and division and is stored in the store register 22 or 23 in the case of addition and subtraction. Operation of these arithmetical calculations is more fully described in the Specification of British Pat. No. 1,042,785.

In addition to the calcultaing machine embodying a series of keys representative of the numbers 0 to 9, it also includes a series of keys which represent the function of the machine. That is to say, if the machine is to effect addition, an addition key is depressed and this causes a positive potential to be applied to the points +. Similarly if subtraction is to be effected, a positive potential is applied to the points marked —. Similarly, for multiplication and division a positive potential to the points marked X*t* and ÷. Also for left shift and right shift operations the point N is rendered positive.

Furthermore, pulses are applied to the respective stages of the register 20 until the zero condition is reached. When the stages of the register 20 reach zero a carry pulse is generated. Likewise, when pulses are applied to the visual decimal point counter **20*a*, a carry pulse is given off as this counter reaches zero and this is passed to a carry store which causes alternate voltages C01 and ≠C01 to be given off. The pulse C01 is given off as the carry pulse is generated and remains until the next P0 pulse is received, but at other times the voltage ≠C01 is generated. Likewise, a pulse C02 is given off from the decimal point counter of the store registers 22, 23 after a carry pulse has been generated, but a pulse ≠C02** is generated until the carry pulse is generated.

When a multiplication operation is to be effected the multiplication function key is depressed and this serves to apply a positive potential to the point X*t* on the gate 36 and on the gate 29. This causes a supply of pulses to be applied from the point GD to the amplifier 25 and hence to the respective stages of the circuit 1 of the registers 22, 23. Multiplication is carried out as a "multiply through" operation, as is more fully described in the specification of British Pat. No. 1,042,785. This multiplies the multiplier in the visual register by the multiplicand in the store register so that the product is displayed in the visual register. The numbers are multiplied from left to right so that the highest digit is displayed in stage 11 of the register, but if there is a carry the highest number is displayed in stage 12 of the visual register. Towards the end of a multiplication, during the time TD, pulses are applied to the decimal point counter stage **22*a* or 23*a* of the register. A series of ten pulses is applied to this stage and this serves to return the counter to its original position because it has ten positions. However, when the counter passes through its zero position, a voltage C02 is emitted and this voltage opens the gate 29 to cause pulses from the point GD to be passed through the amplifier 28 to the highway 21 to the decimal point counter stage 20. Pulses received after receipt of the carry pulse are transmitted to the stage 20***a* and this allows the pulses to be added to the visual decimal point counter stage by a number corresponding to the position of the decimal point in the decimal point counter stage 22*a* or 23*a*. Thus, for example, if a decimal point in a respective one of the reigsters 22 or 23 is in a second position, the pulse will be applied to the decimal point counter to emit a carry pulse after eight pulses have been received. Subsequently, after passing through zero further pulses will be applied through the gate 29 to increase the number stored in the decimal point counter stage in the visual register by two positions.

In a similar manner when division is to be effected, a similar operation takes place except that all the pulses emitted before receipt of the carry pulse are passed to the visual decimal point counter instead of the pulses received after receipt of the carry pulse. When this happens the pulse ≠C02 is applied to the point ≠C02 on the gate 31 to open this gate and cause a supply of pulses to be applied from the source GD to the decimal point counter of the register 20, but this supply is switched off as a carry pulse C02 is emitted. Thus again if the number entered in the store registers 22 or 23 has a decimal point located in the second position, eight pulses received before the carry pulse is emitted are passed to the register. This corresponds to moving the decimal point two points to the left.

Although the position of the decimal point may be adjusted at any convenient time during calculations, it is suitable to effect this on multiplication when the voltages TD, *t*1 and C— are positive. This occurs only once in each multiplication and happens when the buffer circuit used in the multiplication process is operative. Similarly, it is suitable to effect adjustment of the decimal point on the division when the voltages TD, *t*1 and C+ are positive.

When an addition calculation is to be carried out the larger number is entered in the store register and a second number is entered in the visual register and a decimal point is inserted in the two numbers as required.

An addition causes a positive potential to be supplied to the point + on the gate 33 which causes a series of pulses to be applied to the highway 21. A series of pulses are passed to the visual decimal point counters 20*a* and 22*a* or 23*a*. This continues until a carry pulse C02 is generated from the counter 22*a* or 23*a*. Thus at this time the complement of the number in the decimal point counter 23*a*, 22*a* is added to the number stored in the visual decimal point counter 20*a*. Entry of these pulses causes the number of pulses stored in the visual decimal point counter 20*a* to be equivalent to the complement of the difference of the numbers representative of the decimal point positions.

After the above operation has occurred P9 pulses supplied to the visual decimal point counter through the gate 41 are also supplied by the timer circuit 15, the timer circuit 18 being inhibited by the gate circuit 42 until the timers can run in step. Further pulses are applied to the visual decimal point counter stage (whose position is equivalent to the complement of the difference in the positions of the decimal points). Consequently, these further pulses supplied until the carry C01 is given off are equivalent in number to the difference in the positions of the decimal points. These pulses are also applied to the gate 42 which causes the lines T0–T13 to run until the carry C01 is given off. At this time the timer circuits 15, 18 are running in step specifying that the decimal points are in step and the voltage D≠0 then becomes negative and the gate 42 is opened and a positive voltage appears ont the output D=0. Addition can then be carried out in the usual way with the denominations of the numbers in step. That is to say, the number stored in the stages of the visual registers are added to the number stored in the respective stages of the store register by adding the number of pulses in these stages of the visual register controlled by the emission of the carry pulse, into the stages of the store register. The position of the decimal point counter in the store register indicates the position of the decimal point in the answer.

The subtraction decimal point operation is similar to the addition operation. The tens complement of the numbers stored in the decimal point counter stage 22*a* is passed through the gate 33 to the line 21 to the decimal point counter stage 20*a*. If the complement of the number stored in the decimal point counter 20*a* is not zero a waveform specified as the signal D≠0 is then applied to the gate 42 which is later opened to permit subtraction to take place in the usual way.

When it is required to effect a left shift, the left shift key is depressed. This has the effect of applying a positive potential to the point N and to supply a positive voltage to the ÷ point on the gate 31. This has the effect of supplying nine pulses to the line 21 and causes the position of the decimal point to be moved nine points to the right. This corresponds to moving the decimal point one position to the left.

When it is required to effect a right shift, the right shift button is depressed. This causes a positive potential to be applied to the point N and to the point X*t* on the gate 29. This causes a P9 pulse to be passed to the visual decimal point counter stage which causes the position of the decimal point to be moved one position to the right.

What I claim is:

1. A calculating machine including a pair of registers each having a plurality of stages and each register having a decimal point register counter with a plurality of positions; each position representing the position of a decimal point between two adjacent stages of the register and only one decimal point position of which is operative at any one time; means for effecting an arithmetic calculation; means for sensing the position of the decimal point in the decimal point counters; and means for calculating the position of the decimal point in the decimal point counter corresponding to the answer to the calculation in accordance with the position of the decimal point in the registers and in accordance with the kind of calculation effected including a pair of timer circuits to enter pulses into one of the registers to effect arithmetic calculations and into the decimal point counters to represent the position of the decimal point in the numbers entered in the register; drive circuits to advance the operation of the timer circuits with reference to the other timer circuit and a gate to inhibit the selected drive timer circuit until the timer circuits can run together in accordance with the positions of the decimal points in the numbers in the register.

2. A calculating machine according to claim 1 having means for applying pulses whose number corresponds to the complement of the number entered in the one decimal point counter into the other decimal point counter (which is equivalent to the difference of the numbers representative of the decimal point positions); means for controlling the time of entry of addition pulses corresponding to the numbers entered in the stages of the one register into the respective stages of the other register under the control of the number stored in the other decimal point counter so that the denominations of the numbers to be added run in step thereby adding into the stages of the one register a number of pulses corresponding to the number stored in the respective stages of the other register.

3. A calculating machine as defined in claim 2 wherein the position of the decimal point counter in the one register indicates the position of the decimal point in the answer.

4. A calculating machine according to claim 1 having means for applying pulses whose number corresponds to the complement of the number entered in the one decimal point counter into the other decimal point counter (which is equivalent to the difference of the numbers representative of the decimal point positions); means for controlling the time of entry of subtraction pulses corresponding to the complement of the numbers entered in the stages of the one register into the respective stages of the other register under the control of the number stored in the other decimal point counter so that the denominations of the numbers to be added run in step thereby adding into the stages of the one register a number of pulses corresponding to the number stored in the respective stages of the other register.

5. A calculating machine according to claim 2 wherein the one decimal point counter is associated with a store register and the other decimal point counter is associated with a visual register.

6. A calculating machine according to claim 2 having a gate made operative under the control of an addition instruction key to supply pulses to the stages of the registers.

7. A calculating machine according to claim 4 having a gate made operative under the control of a subtraction instruction key to supply pulses to the stages of the registers.

8. A calculating machine according to claim 1 having means for effecting a multiplication operation wherein the position of the decimal point in one of the registers is sensed and the position of the decimal point in the other register is altered in accordance with the number sensed.

9. A calculating machine according to claim 8 wherein the position of the decimal point is sensed by means to emit a carry pulse and means to supply pulses emitted after the carry pulse to the other register to vary the position of the decimal point counter by the number of pulses emitted.

10. A calculating machine according to claim 1 having means for effecting a division operation wherein the position of the decimal point in one of the registers is sensed and the position of the decimal point in the other register is altered in accordance with the number sensed.

11. A calculating machine according to claim 10 wherein the position of the decimal point is sensed by means to emit a carry pulse and means to supply pulses emitted before the carry pulse to the other register to vary the position of the decimal point counter by the number of pulses emitted.

References Cited

UNITED STATES PATENTS 3,193,669 7/1965 Voltin ------------ 235—160

MALCOLM A. MORRISON, Primary Examiner

R. S. DILDINE, Jr., Assistant Examiner